United States Patent
Lamgaday et al.

(10) Patent No.: US 9,688,108 B1
(45) Date of Patent: Jun. 27, 2017

(54) DUAL TIRE AIR MAINTENANCE SYSTEM AND METHOD

(71) Applicant: The Goodyear Tire & Rubber Company, Akron, OH (US)

(72) Inventors: Robin Lamgaday, Wadsworth, OH (US); Arun Kumar Byatarayanapura Gopala, Copley, OH (US); Christopher Paul Hunt, Stow, OH (US); Dinesh Chandra, Hudson, OH (US); Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/957,771

(22) Filed: Dec. 3, 2015

(51) Int. Cl.
*B60C 23/12* (2006.01)
*B60C 29/06* (2006.01)
*B60C 23/00* (2006.01)
*B60B 11/00* (2006.01)
*B60S 5/04* (2006.01)

(52) U.S. Cl.
CPC ............ *B60C 23/12* (2013.01); *B60C 23/004* (2013.01); *B60C 23/007* (2013.01); *B60C 29/068* (2013.04); *B60B 11/00* (2013.01); *B60S 5/04* (2013.01)

(58) Field of Classification Search
CPC ..... B60C 23/12; B60C 23/004; B60C 23/006; B60C 23/007; B60C 29/02; B60C 29/04; B60C 29/068
See application file for complete search history.

(56) References Cited

U.S. PATENT DOCUMENTS

| 1,404,754 | A |   | 1/1922  | Gammeter |              |
|-----------|---|---|---------|----------|--------------|
| 1,558,025 | A | * | 10/1925 | Ludwick  | B60C 23/007  |
|           |   |   |         |          | 152/415      |
| 1,882,455 | A | * | 10/1932 | Spicer   | B60C 23/004  |
|           |   |   |         |          | 116/34 R     |
| 2,251,713 | A | * | 8/1941  | Meiser   | B60C 23/004  |
|           |   |   |         |          | 137/512      |
| 3,533,060 | A |   | 10/1970 | Aker     |              |
| 4,387,931 | A | * | 6/1983  | Bland    | B60C 23/007  |
|           |   |   |         |          | 152/416      |

(Continued)

FOREIGN PATENT DOCUMENTS

WO   2013173662 A1   11/2013

OTHER PUBLICATIONS

EPO Search Report received by Applicant on Apr. 3, 2017.

*Primary Examiner* — Kip T Kotter
(74) *Attorney, Agent, or Firm* — Robert N. Lipcsik

(57) ABSTRACT

An air maintenance tire system and method in accordance with the present invention includes an air pumping mechanism configured to maintain air pressure within a first tire and a second tire in a dual tire arrangement. The system includes a control valve assembly attached to an elongate valve stem projecting from a rim of a first tandem tire, and a one-way valve carrying connecting tube from a sidewall air pumping passageway within a sidewall of the first tire. The control valve assembly further includes first and second outlet tubes connected to the elongate valve stem to selectively pass pressurized air into the tire cavities of both tandem mounted tires on an as-needed basis.

14 Claims, 8 Drawing Sheets

(56) References Cited

U.S. PATENT DOCUMENTS

| | | |
|---|---|---|
| 5,287,906 A * | 2/1994 | Stech .................... B60C 23/007 141/38 |
| 6,499,343 B1 | 12/2002 | Haas et al. |
| 6,581,449 B1 | 6/2003 | Brown et al. |
| 6,772,812 B1 | 8/2004 | Hamilton |
| 7,234,485 B2 | 6/2007 | Yamamoto et al. |
| 7,285,868 B2 | 10/2007 | Wilson |
| 7,408,453 B2 | 8/2008 | Breed |
| 7,478,554 B2 | 1/2009 | Roth et al. |
| 8,042,586 B2 | 10/2011 | Losey et al. |
| 8,113,254 B2 | 2/2012 | Benedict |
| 8,146,413 B1 | 4/2012 | Grace |
| 8,807,182 B2 | 8/2014 | Kelly |
| 8,820,369 B2 * | 9/2014 | Hinque ................... B60C 23/12 152/45 |
| 2002/0134428 A1 | 9/2002 | Gabelmann |
| 2012/0024445 A1 * | 2/2012 | Wilson .................. B60C 23/003 152/415 |
| 2012/0285596 A1 * | 11/2012 | Hrabal .................... B60C 23/12 152/450 |
| 2012/0305101 A1 | 12/2012 | Merrill |
| 2013/0146193 A1 * | 6/2013 | Stephenson ........... B60C 23/007 152/415 |
| 2015/0122390 A1 * | 5/2015 | Durr ....................... B60C 23/12 152/450 |
| 2016/0114635 A1 * | 4/2016 | Lamgaday ............. B60C 23/12 141/4 |

* cited by examiner

DUAL TIRE AIR MAINTENANCE SYSTEM AND METHOD

FIELD OF THE INVENTION

The present invention relates generally to air maintenance tires and, more specifically, to a tire assembly incorporating an air pumping mechanism into a tire for maintaining tire air pressure.

BACKGROUND OF THE PRESENT INVENTION

Properly inflated tires are important for vehicle operational efficiency. Many vehicles, particularly trucks, have dual tires mounted in tandem on an axle. Since, normal air diffusion reduces tire pressure over time, the natural state of such tires is underinflated. In a dual tire system, one or both tires may lose air resulting in the need for re-pressurization. It is desirable, therefore, to incorporate an air maintenance feature within a tire that will self-maintain the tire air pressure in order to compensate for any reduction in tire pressure over time without a need for driver intervention. For dual tire systems, such an air maintenance feature should be capable of easy, economical and efficient installation into a tire and be capable of maintaining both tires in the tandem at requisite equal pressure.

SUMMARY OF THE INVENTION

An air maintenance tire system and method in accordance with the present invention includes an air pumping mechanism configured to maintain air pressure within both a first and a second tire mounted side-by-side. The system includes a first tire and a second tire mounted in side-by-side relationship to an axle, and a control valve assembly including a control valve housing attached to an elongate valve stem projecting from a rim of the first tire. The control valve assembly enables a flow of pressurized air into the tire cavities of the first tire and the second tire from a pumping air passageway within a first sidewall of the first tire. A connecting tube extends between the sidewall air passageway and the control valve assembly, the connecting tube having a one way valve mounted to control pressurized air flow into the control valve housing from the sidewall air passageway.

In another aspect, the air maintenance tire system includes with the control valve assembly a relief valve mounted to the control valve housing to vent air pressure from the control valve housing in the event that the air pressure exceeds a preset threshold.

DEFINITIONS

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

BRIEF DESCRIPTION OF THE DRAWINGS

The present invention will be described by way of example and with reference to the accompanying drawings, in which.

DESCRIPTION OF THE PRESENT INVENTION

Figure 1:
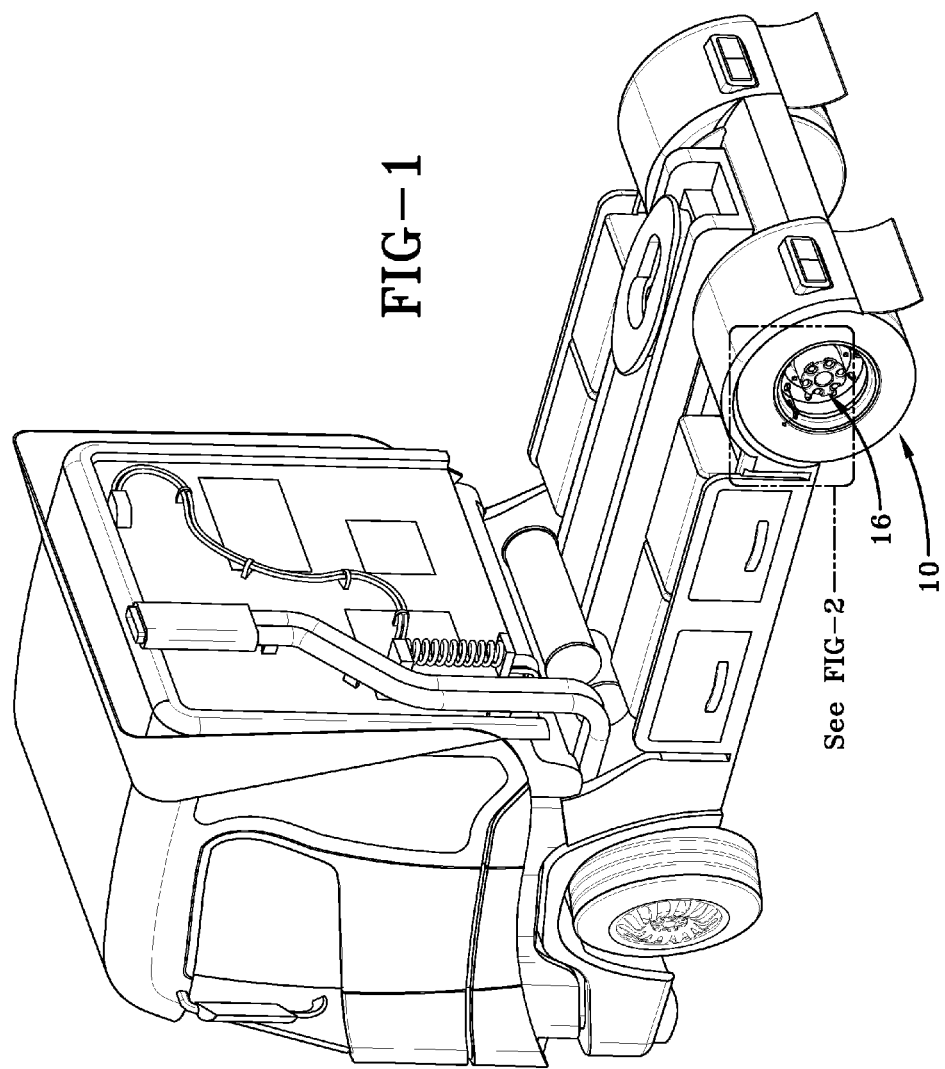
FIG. 1 is a perspective view of a tractor having dual tires on a rear axle.

Referring to FIGS. 1, 2, 3, 4A and 4B, a dual tire arrangement of first and second tires 12, 14 is seen at assembly 10. The first tire 12 and the second tire 14 are mounted to respective rims 13, 15 and to a common axle 16. Each tire 12, 14 is conventionally formed having a pair of sidewalls 18, 20 extending from beads 26 to a crown region 28. Each of the tires 12, 14 encloses a respective cavity 22, 24. As seen, a peristaltic pump assembly 30 is formed within an outer sidewall 18 of the outer first tire 12 generally adjacent the bead 26 of the tire. The pump assembly 30 includes a tube 34 extending annularly about the sidewall and having tube ends terminating at a transfer housing 36. The tube 34 is formed of a resilient, flexible material, such as plastic or rubber compounds that are capable of withstanding repeated deformation cycles of the tire 12. So constructed, the tube 34 will deform segment-by-segment within the tire 12 into a flattened condition subject to external force and, upon removal of such force, return to an original unflattened condition. In the example shown, the cross-section of the tube 34 in an unstressed state may be generally circular, but other alternative tube geometries may be employed. The tube 34 may have a diameter sufficient to operatively pass a requisite volume of air sufficient for the purpose of pumping air into the tire cavities 22, 24 to maintain the tires 12, 14 at a preferred inflation pressure.

The peristaltic principles of incorporating a deformable air tube within a tire are shown and described in U.S. Pat. No. 8,113,254 entitled SELF-INFLATING TIRE incorporated herein by reference in its entirety. The tube 34 may be incorporated within an annular tire passageway formed within the tire proximate a tire bead region. As the tire 12 rotates, air from outside the tire may be admitted into the tube 34 and pumped along the air tube by the progressive squeezing of the tube within the tire as the tire rotates. Air is thus forced into an outlet valve and then into the tire cavity to maintain air pressure within the tire cavity at a desired pressure level. The tube 34 may be replaced by forming an enclosed pumping passageway within the sidewall 18 if so desired (not shown). A passageway if so integrated within the sidewall would function to peristaltic pump air segment-by-segment along the passageway as with the tube embodiment shown.

The tube 34 mounts closely within a groove in the tire and sequentially flattens segment-by-segment as the tire rotates. The segment-by-segment flattening of the tube 34 as the tire 12 rotates operates to pump air which is then directed into the tire cavities 22, 24 to maintain the desired pressure level. A peristaltic pumping system employing a tube within a sidewall groove is also shown in U.S. Pat. No. 8,042,586 entitled SELF-INFLATING TIRE ASSEMBLY incorporated herein by reference in its entirety.

Referring to FIGS. 2, 3, 4A and 4B, the pump tube 34 is generally annular and circumscribes a lower tire sidewall region proximate to the 26 bead region of sidewall 18. However, other configurations for the tube 34 may be devised. Opposite ends of the tube 34 connect to a tube transfer housing 36.

The transfer housing 36 is connected to an end of an elongate connecting tube 38. An opposite end of the connecting tube 38 attaches to a control valve assembly 40 including a control valve housing 46 which attaches to the valve stem 42. Seated within the connecting tube 38 proximate the control valve housing 46 is a one-way check valve 44 (FIG. 4A) of a type commercially available that opens and closes to admit air from the connecting tube 38 into the an internal air passageway of a control valve tire valve stem 42 but prevents a back flow of air from the valve stem 42 into the connecting tube 38. A peristaltic system for a single tire application is found in co-pending U.S. Pat. No. 9,533,534, filed on Oct. 22, 2014 and entitled AIR MAINTENANCE TIRE AND VALVE ASSEMBLY AND METHOD, incorporated herein by reference in its entirety. The co-pending application shows an air maintenance tire (AMT) system incorporating a peristaltic pump into a tire sidewall and pumping pressurized air from a pumping tube within a tire sidewall into a valve stem of a tire as the tire rotates to maintain that tire in an inflated condition.

With continued reference to FIGS. 3, 4A, 4B, 5, 6 and 7, the subject dual tire system is shown. The control valve housing 46 has a longitudinal internal air passageway 48. The tire valve stem 42 is coupled to a forward end of the air passageway 48 in air flow communication. The tire valve stem 42 is generally of conventional configuration, referred to within the industry as a "Schrader" valve. The tire valve stem 42 conducts air from an external pressurized air source through the valve stem and into the valve housing air passageway 48. A cap 50 screws over the valve stem 42 when not in use to prevent contaminants from entering the valve stem.

Attached to mount to the control valve housing 46 in air flow communication with the passageway 48 is a safety relief valve 52 of a type commercially available. The relief valve 52 operates to vent air from the housing passageway 48 when the tire pressure of both tires 12, 14 is at or above a desired preset inflation level. Relief valve 52 is set to open when air pressure within the control valve passageway 48 is above the pressure inflation level desired for the dual tires.

An outlet tube 58 is coupled to the control valve housing 46. Tube 58 is generally T-shaped having a tube segment 54 connecting at a right angle with a linear tube segment 60. A T-shaped air passageway 57 resides within the tube 58, shared by both the tube segment 54 and the linear tube segment 60 as shown. The tube segment 54 has a nut 56 connecting to an elongate second outlet tube 64. The linear tube segment 60 has a threaded coupling 61 that attaches the segment 60 to an elongate, L-shaped first outlet tube 62.

The first outlet tube 62 extends from the control valve housing 46 in a linear path to a right angle bend. From the right angle bend, the tube 62 extends a terminal end 66 through the rim 13 carrying the first tire 12. The tube 62 is thus connected to the tire rim and in air flow communication with tire cavity 22 of the first tire 12. The second outlet tube 64 is coupled by nut 56 to the tube segment 54. The second outlet tube 64 extends from the tube segment 54 along an elongate linear path spanning both of the rims 13, 15. At a terminal end, the second outlet tube 64 is coupled to a right angle sleeve 70 by screw coupling 68. The sleeve 70 connects at an opposite end to a rim tube 72 that routes back to a right angle bend 73. The rim tube at bend 73 turns to project through the rim 15. A terminal end 74 of the rim tube 72 is thus positioned in air flow communication with cavity 24 of the second tire 14.

Figure 3:
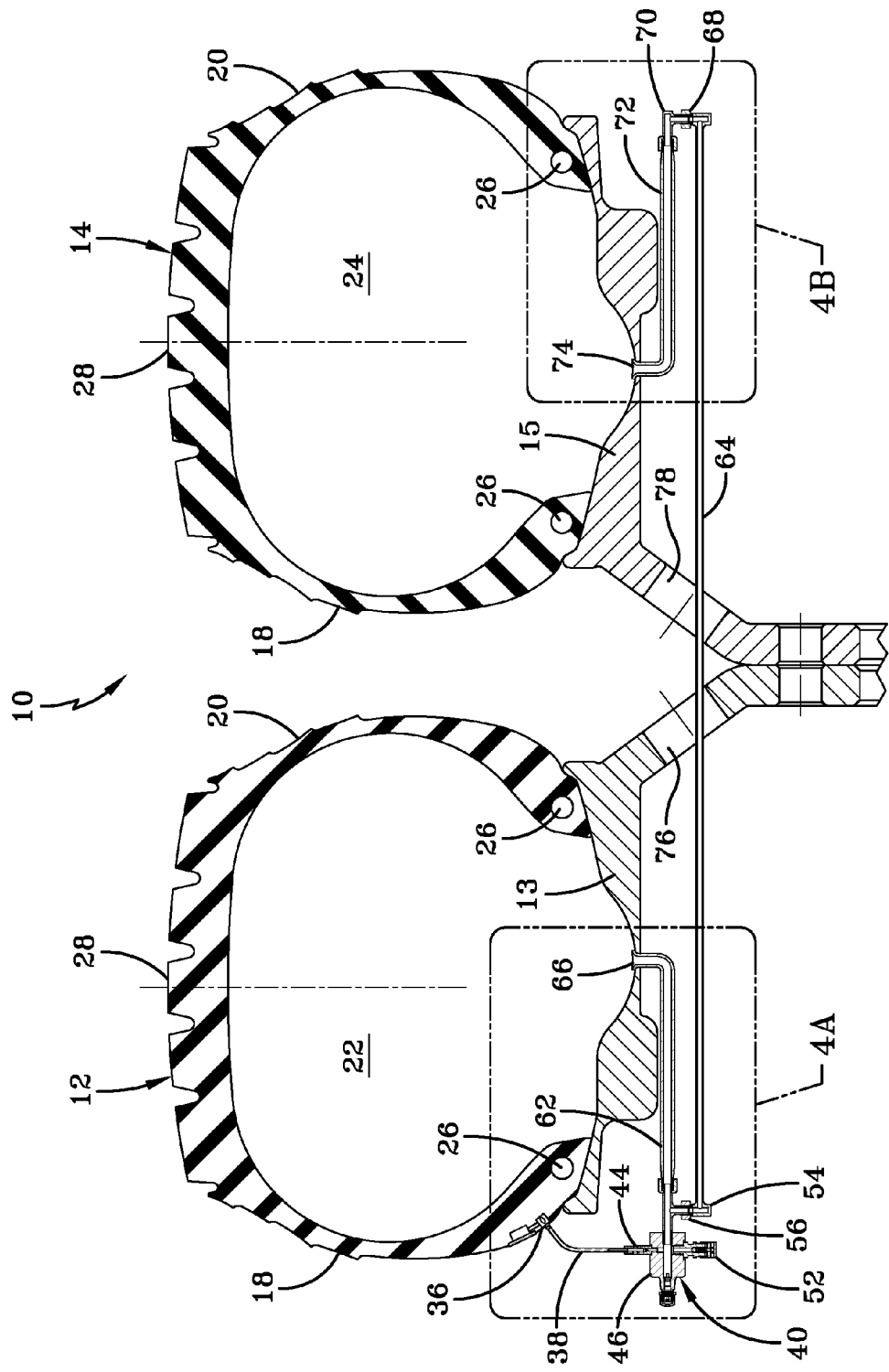
FIG. 3 is a sectional view through dual tires and rims taken from FIG. 2.
Figure 4A:
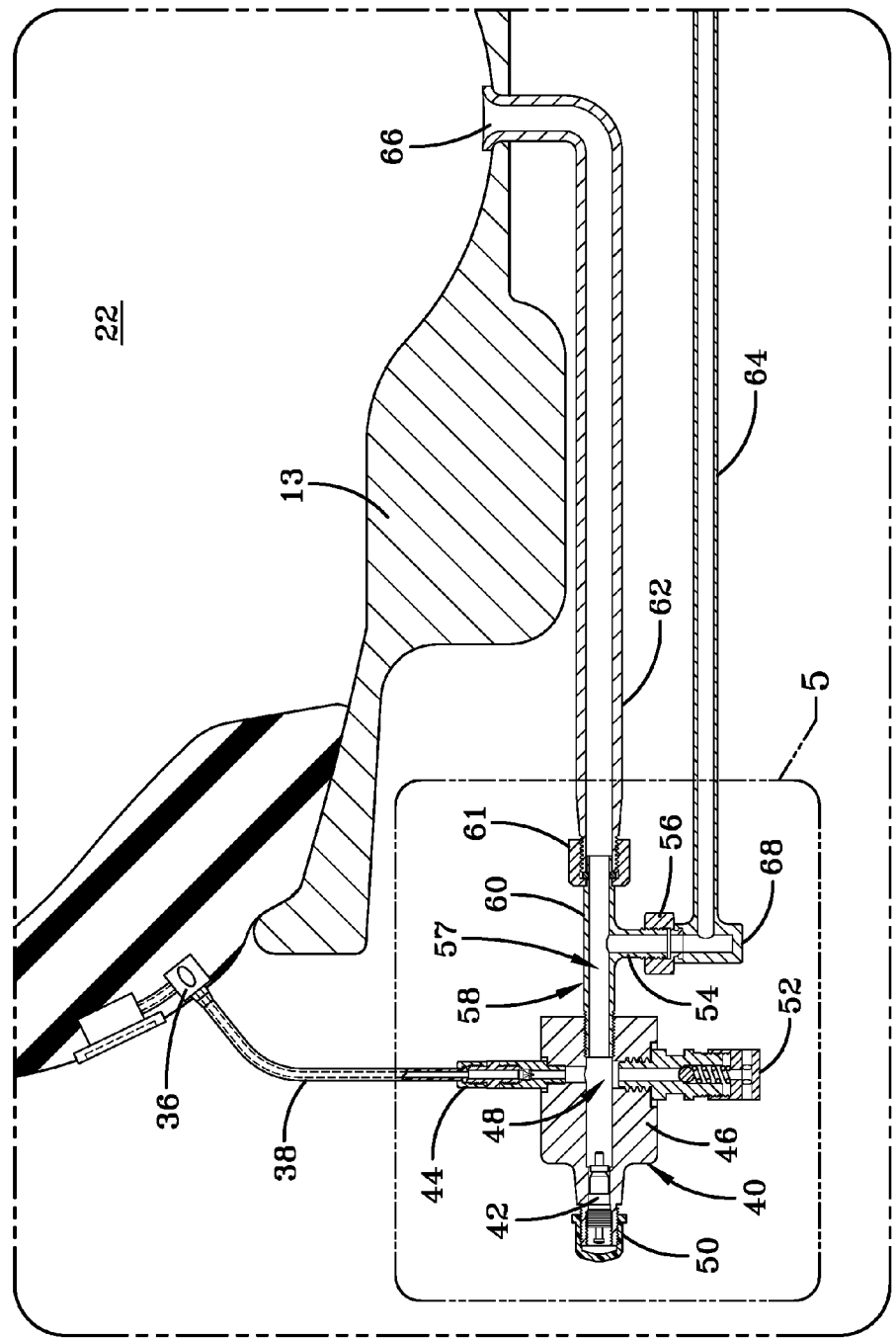
FIG. 4A is an enlarged region of the sectional view of the pumping tire taken from FIG. 3.
Figure 4B:
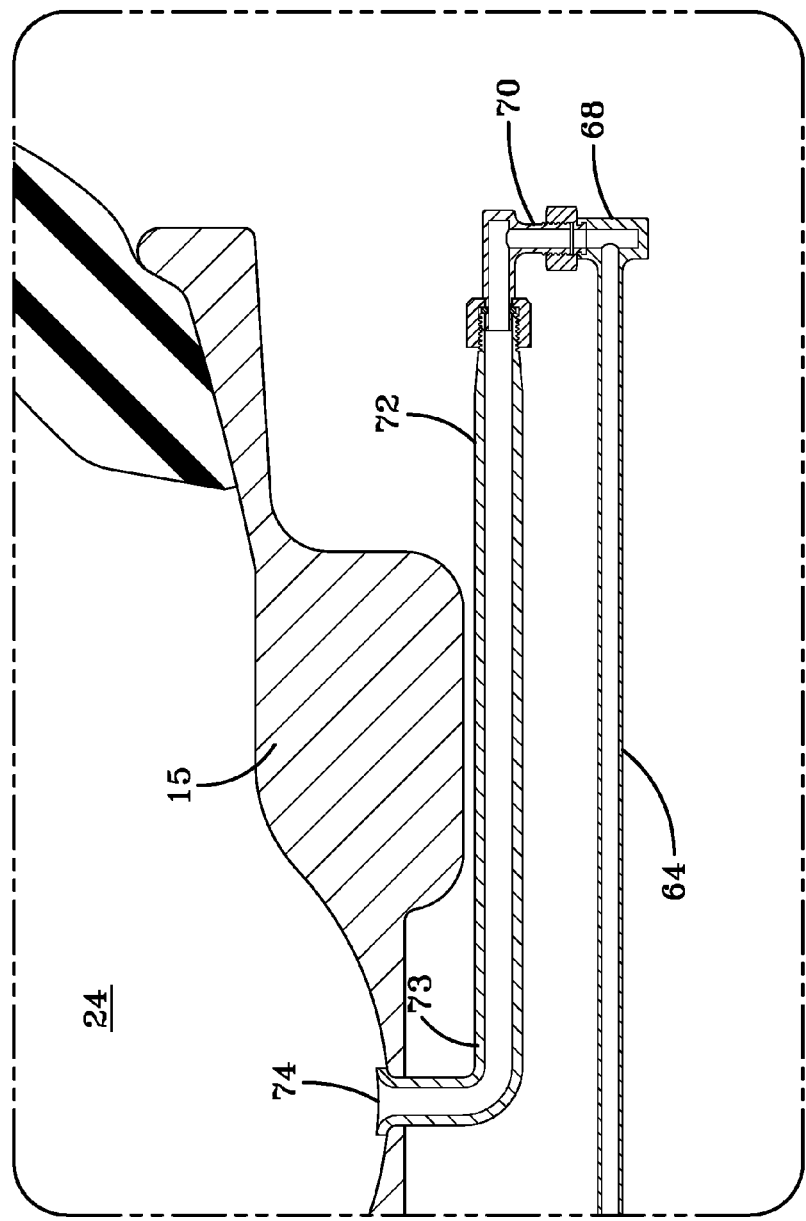
FIG. 4B is an enlarged region of the non-pumping tire taken from FIG. 3.
Figure 5:
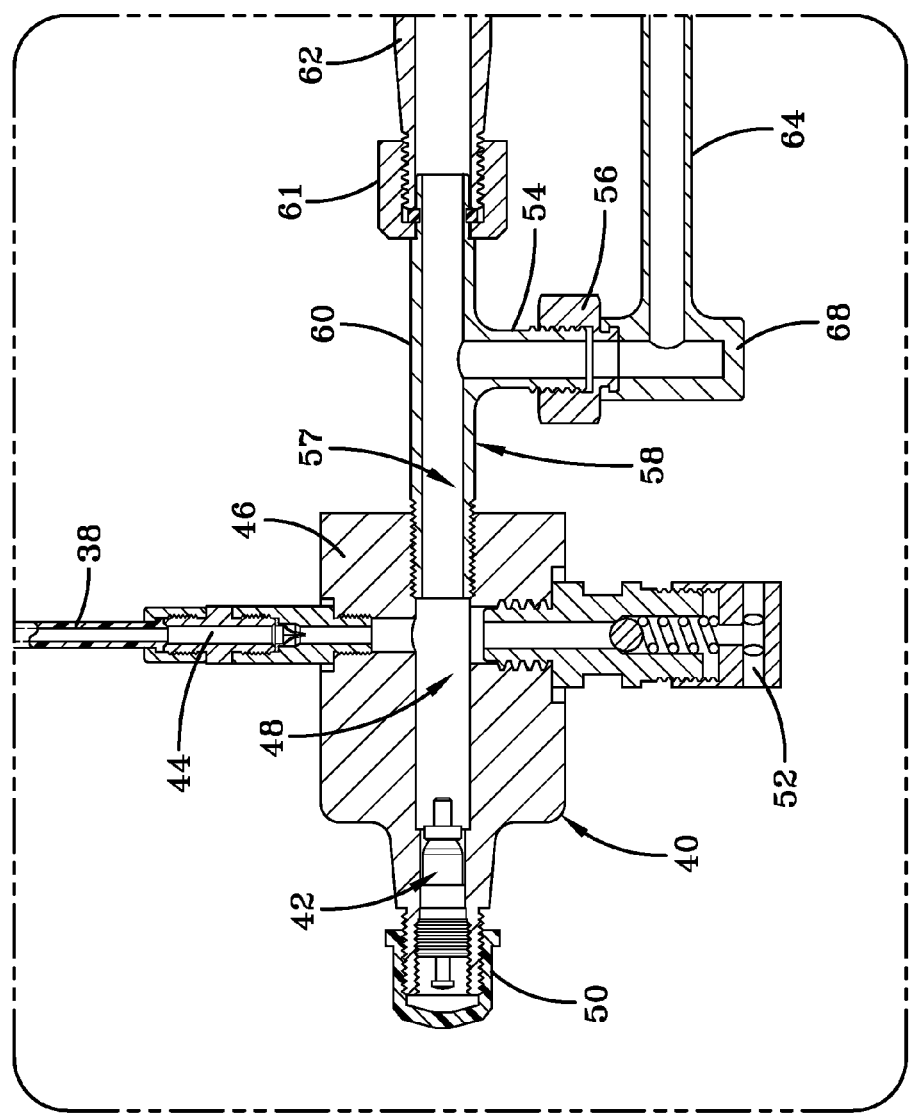
FIG. 5 is an enlarged section view through the valve assembly.
Figure 6:
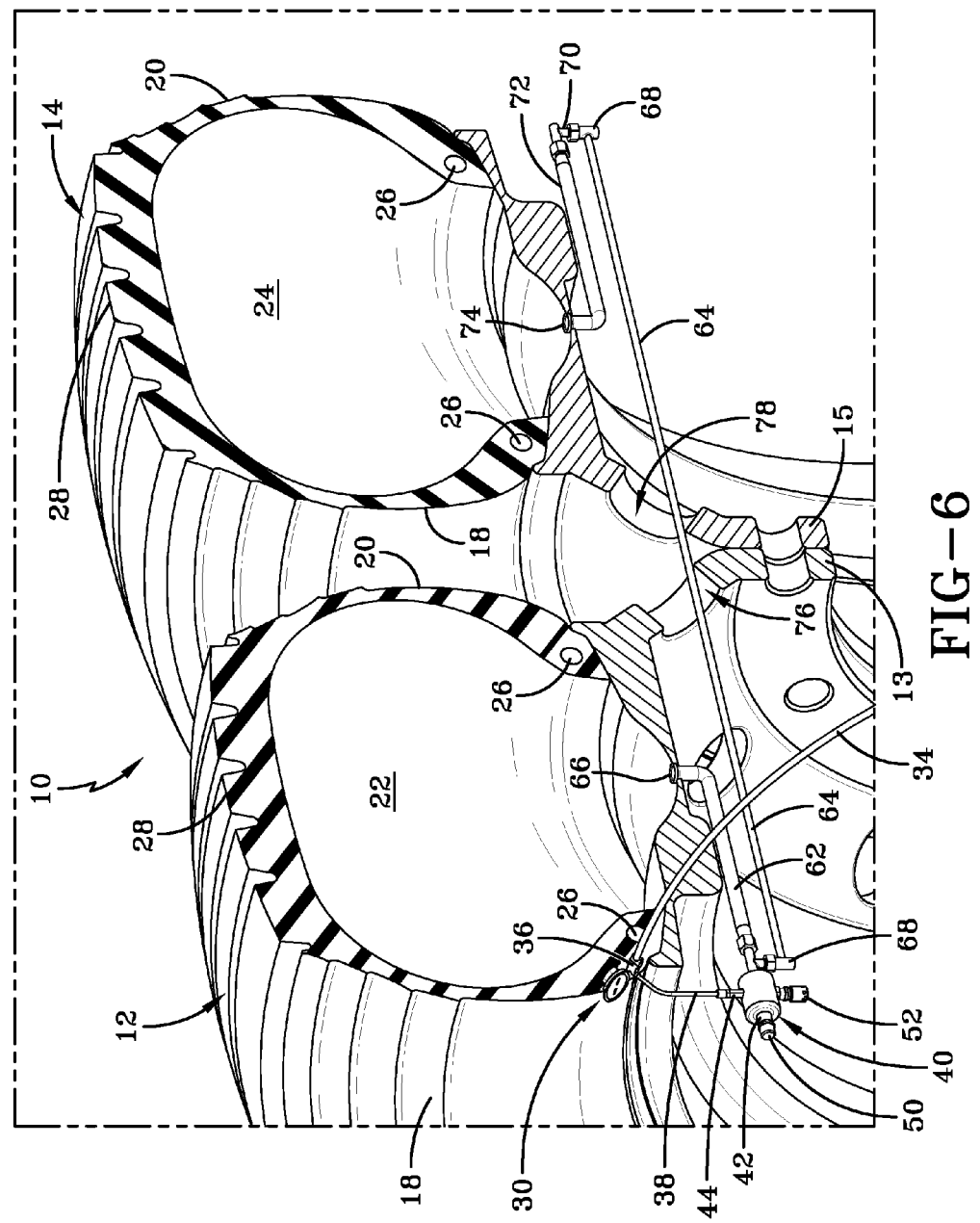
FIG. 6 is an enlarged perspective view in partial section showing the valve assembly and air passageway tubes extending to the tire cavities.
Figure 7:
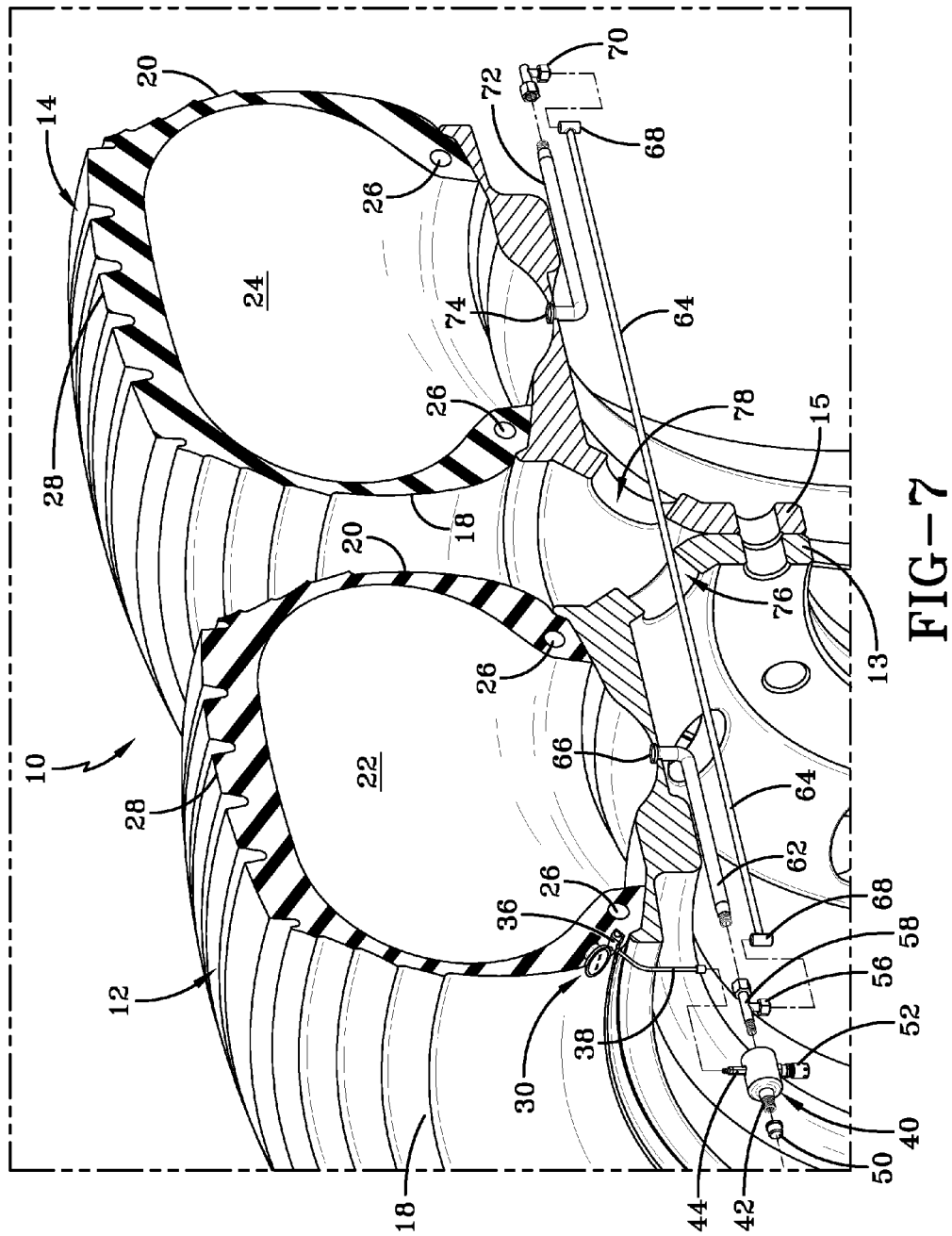
FIG. 7 is an exploded perspective of the valve assembly and tubes of FIG. 7.

FIGS. 3, 6, and 7 illustrate the dual tires 12, 14 in side-by-side relationship mounted to axle 16. The air pumping assembly is mounted to the outer sidewall 18 of the outward tire 12 in the pair of tires 12, 14. As used herein, the "first" tire refers to tire 12 while the "second" tire shall refer to the tire 14. The single air pumping assembly 30 provides air maintenance air pressure to both the tires. The air pumping tube 34 is enclosed within a sidewall 18 of the first tire 12 at a location proximate to the tire bead 26. The connecting tube 38 routes pressurized air through the check valve 44 and into the internal air passageway 48 of the control valve housing 46 (FIG. 5). If the inflation pressure of tires 12, 14 is at or above a preset desired level, pressurized air entering the control valve housing air passageway 48 will be vented to atmosphere as the safety relief valve 52 opens. If either tire is at a low pressure level, the pressurized air from the pumping tube 34 will pass through the one-way valve 44 mounted in the connecting tube 38 and enter the internal air passageway 48 of the control valve housing. The pressurized air within air passageway 48 is then directed into the air passageway 57 of the T-shaped tube connector 58 whereupon the pressurized air will be directed into the outlet tube 62, 64 leading to the underinflated tire 12 and/or 14. If tire 12 is underinflated, pressurized air flows within the first, shorter, outlet tube 62, exiting from end 66, and re-inflating cavity 22. If the tire 14 is underinflated, pressurized air flows through the tube segment 54 and into the second outlet tube 64. If both tires are underinflated, pressurized air will flow to both tires until both tires are reflated to the desired preset level.

Figure 2:
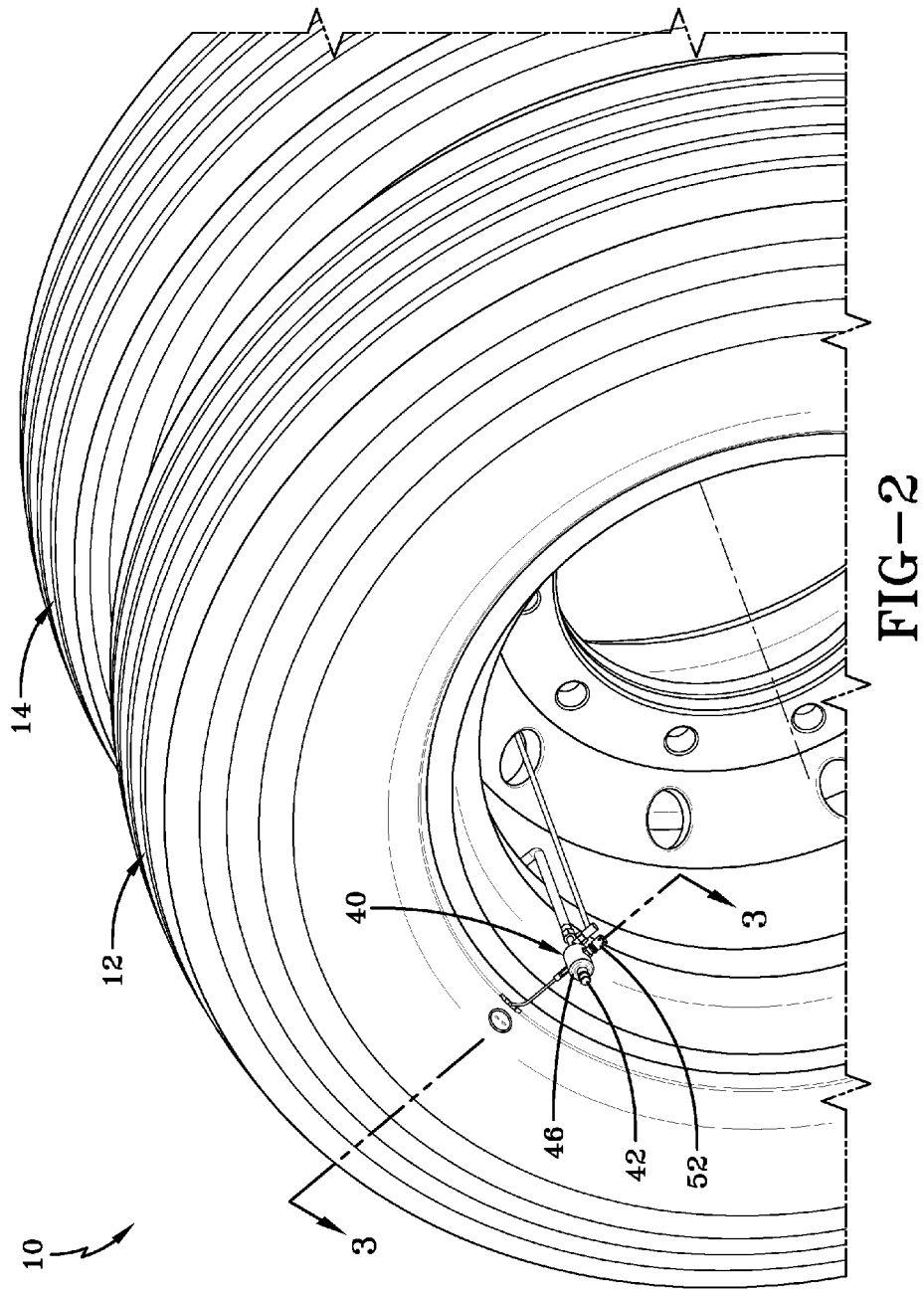
FIG. 2 is an enlarged perspective view of a portion of a pair of dual tires.

It will be noted from FIGS. 2, 5, and 7 that the second outlet tube 64 is elongate and of sufficient length to transverse the aligned tires to an inboard side of tire 14, wherein the tube bends in a reverse bend to extend through the rim 15 and position tube end 74 in an air flow communication with cavity 24. The linear span of the second outlet tube 64 extends through apertures 76 and 78 of the rims 13, 15 which have been aligned to receive the tube 64. During assembly, the rims 13, 15 may be brought into a relationship aligning the through apertures 13, 15 so as to accommodate insertion and positioning of the second outlet tube 64 through apertures 76, 78 as shown. It will be noted from the above that, pursuant to the subject air maintenance system, a single air pumping assembly 30 affixed to a single tire 12 supplies pressurized air to both the air maintenance tire (AMT) 12 and its standard companion tire 14. One single AMT pump mounted to one AMT tire thus will maintain air pressure in both dual tires 12, 14 and pump both tires such as dual truck tires as needed.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. An air maintenance assembly for dual-mounted tires comprising:
    a first tire and second tire mounted in a side-by-side dual relationship mounted to an axle, the first and the second tires each mounted respectively to a first rim and a second rim and each of the first and the second tires having a tire cavity bounded by first and second sidewalls extending to a tire tread region;
    a control valve assembly including a control valve housing having an internal air passageway, the control valve housing being coupled to a valve stem and being external to the tire cavity of each of the first and second tires, the first sidewall of the first tire having an elongate sidewall air passageway therein operatively located to compress segment-by-segment from an expanded diameter to a substantially reduced diameter responsive to a bending strain introduced into the first sidewall from a rolling tire footprint thereby forcing air, segment-by-segment, along the air passageway;
    a connecting tube connected to the elongate sidewall air passageway and to the control valve housing, the connecting tube operative to direct pressurized air into the control valve housing internal air passageway as the tire rolls over a ground surface; and
    wherein the control valve housing is in fluid communication with first and second outlet tubes having internal air passageways operable to conduct pressurized air into the first tire cavity and the second tire cavity on an as-needed basis.

2. The air maintenance tire assembly set forth in claim 1 wherein the control valve housing internal air passageway is positioned in-line with the valve stem.

3. The air maintenance tire assembly set forth in claim 2 wherein the control valve assembly includes a relief valve mounted to the control valve housing for relieving pressure in the control valve housing internal air passageway above a set pressure.

4. The air maintenance tire assembly set forth in claim 3 wherein the connecting tube is coupled in air flow communication with the first sidewall air passageway of the first tire and the internal air passageway of the control valve housing.

5. The air maintenance tire assembly set forth in claim 1, wherein the first and the second rims including co-aligned through-apertures, and wherein the second outlet tube extends through the co-aligned through apertures to the cavity of the second tire.

6. The air maintenance tire assembly set forth in claim 5 wherein the second outlet tube has a substantially linear mid-segment extending through the co-aligned through apertures.

7. The air maintenance tire assembly set forth in claim 6, wherein the first outlet tube and the second outlet tube each having a remote end extending through the first rim and the second rim respectively positioned in air flow communication with the first tire cavity and the second tire cavity.

8. The air maintenance tire assembly set forth in claim 7 wherein the air passageway within the first sidewall of the first tire is substantially annular and resides within the first sidewall proximate to the valve stem.

9. The air maintenance tire assembly set forth in claim 1 wherein a relief valve opens at pressures above a desired pressure.

10. A method for maintaining air pressure within tandem mounted tires comprising:
    mounting a first tire and second tire mounted in a dual side-by-side relationship to an axle, the first and the second tires each mounted respectively to a first rim and a second rim and each of the first and the second tires having a tire cavity bounded by first and second sidewalls extending to a tire tread region;
    providing a control valve housing that is coupled to a valve stem, the control valve housing being external to the tire cavity of each of the first and second tires;
    attaching within the first sidewall of the first tire an elongate sidewall air passageway operatively located to compress segment-by-segment from an expanded diameter to a substantially reduced diameter responsive to a bending strain introduced into the first sidewall from a rolling tire footprint thereby forcing air, segment-by-segment, along the air passageway;
    connecting a connecting tube from the first sidewall air passageway to the control valve housing, the connecting tube operative to sequentially direct air forced from the sidewall air passageway into an internal air passageway of the control valve housing; and
    placing first and second outlet tubes in fluid communication with the internal air passageway of the control valve housing and with the tire cavities of the first tire and the second tire, respectively, operable to pass pressurized air into the first tire cavity and the second tire cavity on an as-needed basis.

11. The method of claim 10, further comprising mounting the internal air passageway of the control valve housing substantially in-line with the valve stem.

12. The method of claim 11, further comprising mounting a relief valve to the control valve housing operable to relieve pressure from the internal air passageway of the control valve housing above a set pressure.

13. The method of claim 12, further comprising mounting a one-way valve within the connecting tube in air flow communication with the internal passageway of the control valve housing.

14. The method of claim 13 wherein further comprising configuring the first sidewall air passageway within the sidewall of the first tire to be substantially annular and to positioning the first sidewall air passageway at a lower sidewall location proximate to the valve stem.

* * * * *